United States Patent [19]

Morrill et al.

[11] 4,371,005
[45] Feb. 1, 1983

[54] PROTECTIVE COVER FOR UNDERWATER FLOW LINE HUB

[75] Inventors: Charles D. Morrill, Bellaire, Tex.; Michael J. A. Best, Dursley, England

[73] Assignee: Smith International, Inc., Newport Beach, Calif.

[21] Appl. No.: 98,965

[22] Filed: Nov. 30, 1979

Related U.S. Application Data

[63] Continuation-in-part of Ser. No. 973,895, Dec. 28, 1978, abandoned.

[51] Int. Cl.³ .............................................. F16L 55/10
[52] U.S. Cl. .................................... 138/89; 138/90; 405/169
[58] Field of Search ............... 405/169; 138/89, 96 R, 138/109, 110; 138/90; 220/315, 324

[56] References Cited

U.S. PATENT DOCUMENTS

| | | | |
|---|---|---|---|
| 2,997,070 | 8/1961 | Penhale | 138/90 |
| 3,701,261 | 10/1972 | Nolan. | |
| 3,766,947 | 10/1973 | Osburn | 138/89 |
| 3,795,115 | 3/1974 | Bergquist et al. | |
| 3,837,685 | 9/1974 | Miller | 285/45 |
| 3,967,462 | 7/1976 | DeJong. | |
| 3,968,838 | 7/1976 | Baugh. | |
| 4,004,635 | 1/1977 | Marquaire et al. | |

FOREIGN PATENT DOCUMENTS 757280 9/1956 United Kingdom ............... 277/126

OTHER PUBLICATIONS

"Deep Water Production Without Divers", Offshore Services, Jan. 1978, pp. 26-31, 34.

Primary Examiner—David H. Corbin
Attorney, Agent, or Firm—Ned L. Conley; David Alan Rose; William E. Shull

[57] ABSTRACT

A temporary hub cover for the hubs of flow lines, hydraulic lines, and electrical conduits and the mating hubs of the underwater production unit includes a body enclosing the hub, plungers within the body for releasably engaging into detents on the hub to hold the cover on the hub, and a trigger mechanism operable from a remote location to release the engagement between the cover and hub whereby the cover can be removed from the hub.

13 Claims, 8 Drawing Figures

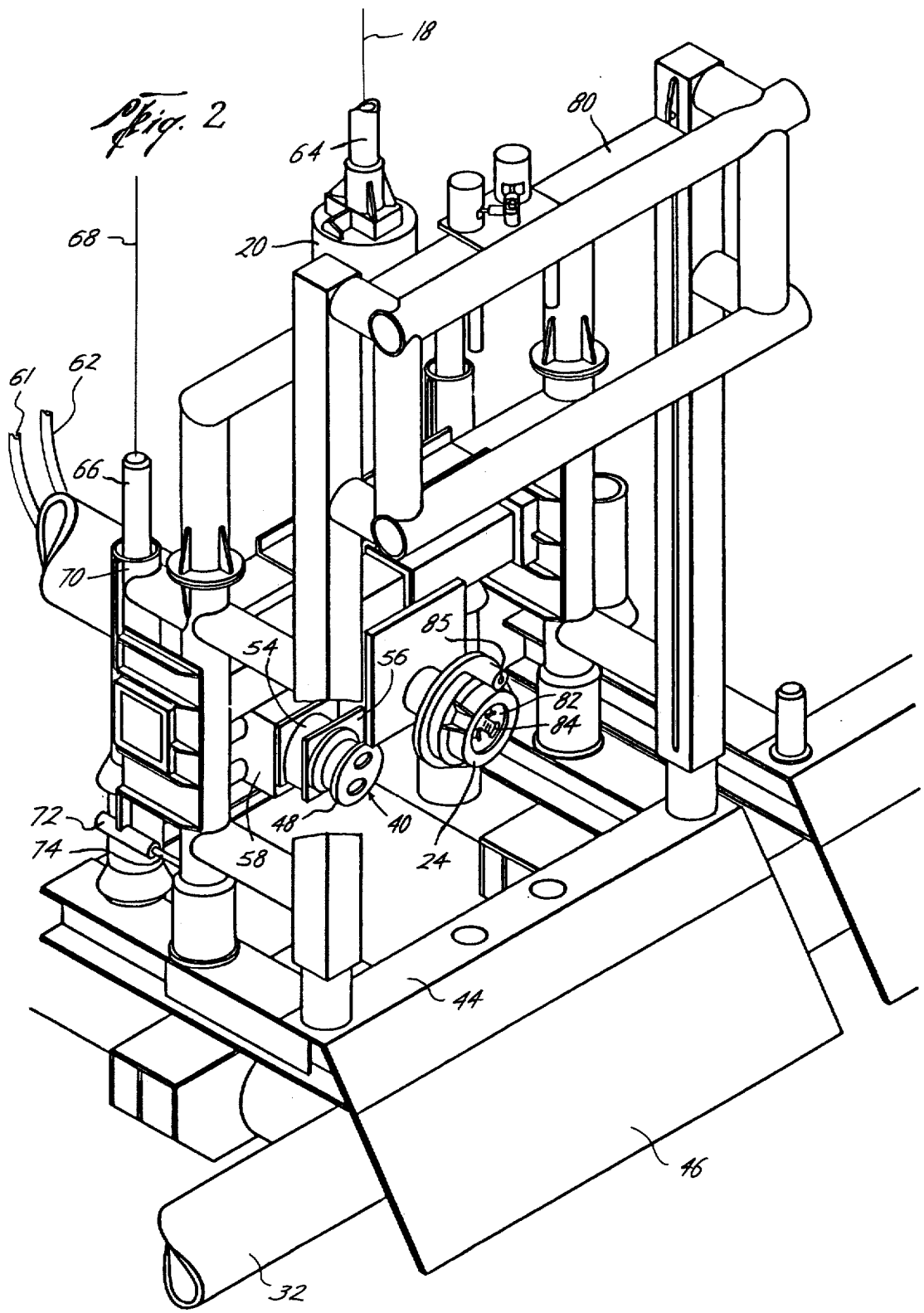

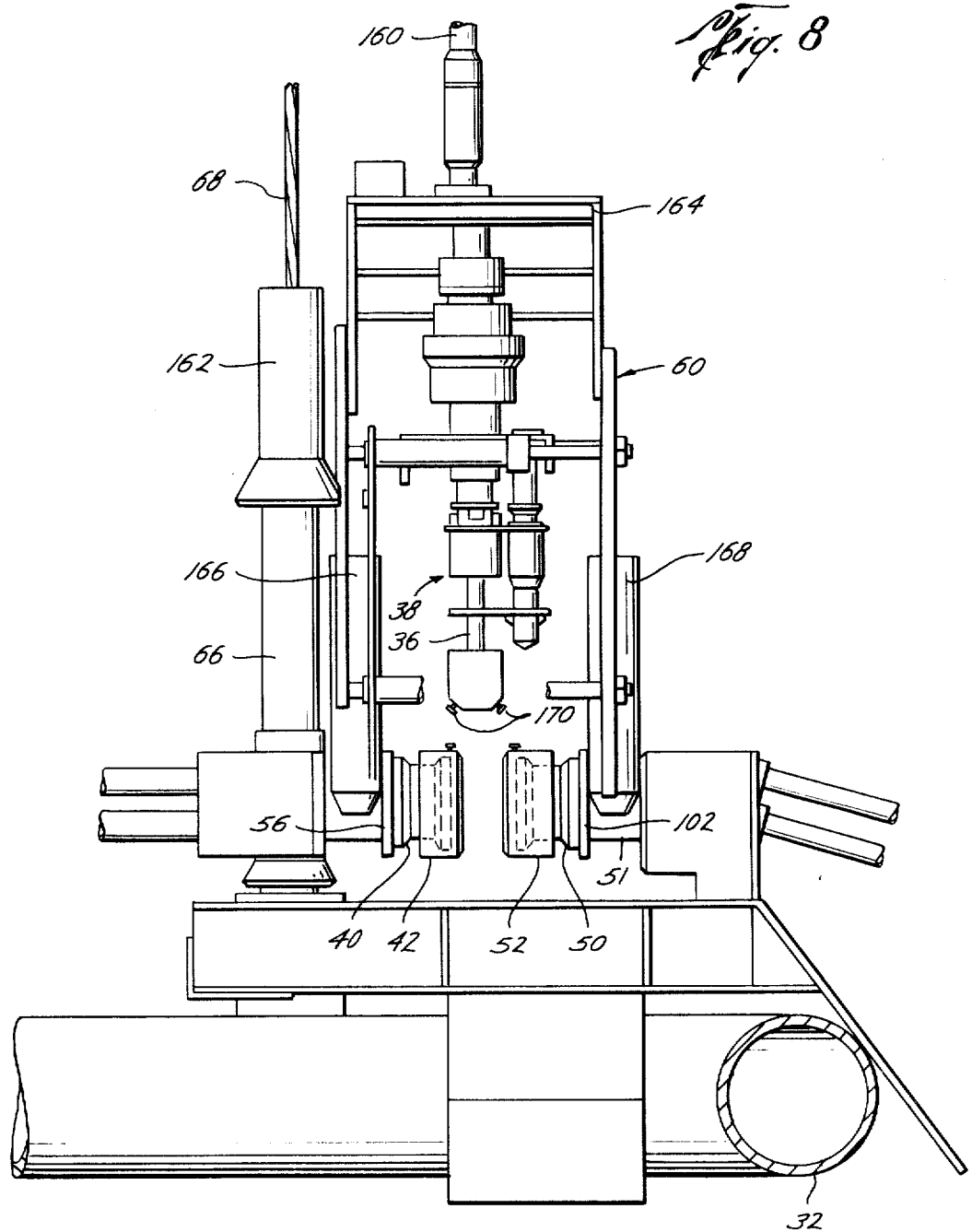

PROTECTIVE COVER FOR UNDERWATER FLOW LINE HUB

REFERENCE TO RELATED APPLICATIONS

This application is a continuation-in-part of U.S. application Ser. No. 973,895, filed Dec. 28, 1978 and now abandoned.

TECHNOLOGY

This invention relates to the remote connection of underwater flow lines, hydraulic control lines and electrical conduits to a subsea production unit such as an underwater Christmas tree or underwater manifold center without the use of divers, and more particularly to protective devices for the hubs of the flow lines, control lines or conduits to be conected.

BACKGROUND OF THE ART

Originally, offshore oil and gas wells were completed on platforms resting on the ocean bottom, or were completed on the bottom with surface production facilities installed on such a platform. Oil and gas produced at such platforms were either collected by tankers or by flow lines laid on the bottom. To the extent that underwater work was required, it was performed by divers, by submarines, or by simple manipulations from the surface.

More recently it has become necessary to drill oil and gas wells in water which is too deep or too dangerous for convenient underwater operations by divers or for use of platforms standing on the bottom. It has thus become necessary to devise methods of connecting subsea oil and gas wells at the ocean floor with flow lines, hydraulic control lines and electrical cables extending to the surface without the use of divers or any permanent surface structure adjacent the underwater well. Various devices have been proposed for achieving such underwater connections, as shown for example in U.S. Pat. Nos. 3,968,838 to Baugh, 4,019,334 to Sinclair, et al, and 4,086,778 to Latham, et al. A better understanding of the problems presented may be obtained by reference to the January 1978 issue of Offshore Services magazine, published by Spearhead Publications Limited, at pages 26 to 51.

In connecting, by remote operation, flow lines, hydraulic lines, and electrical conduits to an underwater production unit, it is essential that the hubs or ends of the lines not be damaged during their descent to the ocean bottom, travel along the ocean floor, and movement onto the production unit for connection thereto. If the hubs become clogged with debris and mud or become marred and damaged, a seal cannot be established between the hub mounted on the production unit and the hub on the terminus of the flow lines, hydraulic lines, and electrical conduits. Thus, where no diver assistance is available, it is necessary to protect the hub with a cover which can be removed by remote operation.

SUMMARY OF THE INVENTION

The present invention provides a temporary hub cover for the hubs of flow lines, hydraulic lines, and electrical conduits and the mating hubs of the underwater production unit. The hub cover includes a body enclosing the hub, plungers within the body for releasably engaging into detents on the hub to hold the cover on the hub, and a trigger mechanism operable from a remote location to release the engagement between the cover and hub whereby the cover can be removed from the hub.

BRIEF DESCRIPTION OF THE DRAWINGS

The accompanying drawings illustrate the presently preferred embodiment of the invention.

FIG. 2 is a perspective view of the pull-in tool shown in FIG. 1;

FIG. 8 is an elevation view of the connecting tool used to remove the protective covers and to engage the hubs when a seal is required.

DESCRIPTION OF THE PREFERRED EMBODIMENT

Figure 1:
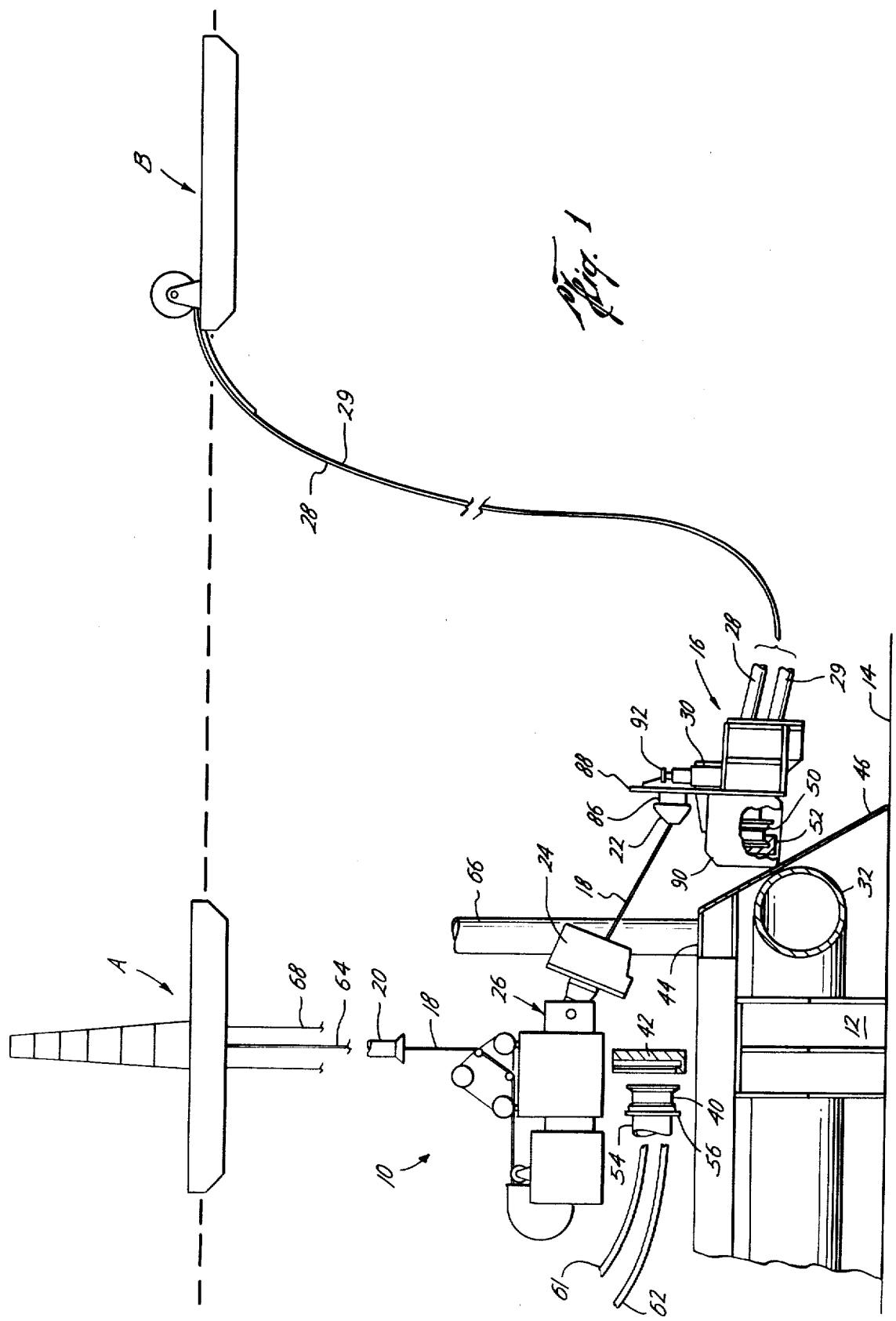
FIG. 1 is a schematic view showing the environment of the invention and the pulling of the flow line bundle by the pull-in tool with the end of the flow line hub shown partly in section.

The present invention is used in connecting flow lines, hydraulic control lines, and electrical conduits to underwater oil and gas production units by remote operation. The method by which the hubs are disposed at a remote location for sealing connection is not of import to the present invention. However, to better understand the environment and application of the present invention, the pull-in method and lay away method will be described. Referring initially to FIG. 1 illustrating the lay away method, a floating vessel A has a pull-in tool 10 which has been lowered to the production unit 12 on the ocean floor 14, and a second vessel B has a flow line bundle 16 to be lowered to the ocean floor 14 for connection to production unit 12. Pull-in tool 10 is attached to flow line bundle 16 by a cable 18 extending from vessel A to vessel B. As pull-in tool 10 is lowered and guided to production unit 12 on the ocean floor 14 from vessel A, cable 18 is paid out from vessel B. Pull-in tool 10 is then landed on production unit 12 and locked into place. Tool 10 includes a hydraulic cable puller 20 to retrieve cable 18 and flow line bundle 16 by using the cable to pull bundle 16 toward production unit 12 as bundle 16 is lowered from vessel B to the ocean floor 14.

By the alternative pull-in method, the flow line bundle 16 and flow lines may be laid at any time. In this method cable 18 is connected to the flow line bundle 16 and either buoyed at the surface or released at a later time by a sonar recall buoy. To initiate the pull-in, the cable 18 is retrieved and keel-hauled beneath vessel A for connection to the pull-in tool 10. Pull-in tool 10 is then lowered to production unit 12 and locked into place. A wireline dart is run down through the drill pipe to latch onto the end of the cable 18 and raised to the surface to begin pulling in flow line bundle 16. Pull-in retrieval and connection operations then proceed as described below with respect to the lay away method.

Flow line bundle 16 includes a bull nose 22 which cooperates with a latch 24 mounted on pull-in tool 10. Cable 18 guides bull nose 22 into latching engagement with latch 24, and alignment means 26 on tool 10 aligns flow bundle 16 with production unit 12. Once flow line bundle 16 is aligned, it is locked into place and pull-in tool 10 is unsecured from production unit 12 and retrieved by vessel A.

Flow line bundle 16 includes one or more flow lines 28, 29 extending to vessel B, a hub 50 with a protective cover 52, and a pull-in adapter 30 having bull nose 22. Production unit 12 includes a mating hub 40 with cover 42 for fluid connection to hub 50.

A connection tool 60 shown in FIG. 8 is lowered from vessel A to remove protective covers 42, 52 attached to hubs 40, 50 respectively, insert a seal plate 36 between hubs 40, 50, move hubs 40, 50 together to sandwich seal plate 36 therebetween, and connect hubs 40, 50 together using clamping means 38.

It must be appreciated that the general environment of the invention has been drawn to the connection of two flow lines 28, 29 to a remote underwater oil and gas production unit and may be used for the remote underwater connection of hydraulic control lines and/or electrical conduits. Production unit 12 may include a Christmas tree or an underwater manifold center where oil and gas are collected from numerous wells, and may include one or more hubs for connection to a plurality of different flow lines, hydraulic control lines, and electrical conduits.

Referring now to FIGS. 1 and 2 to describe the typical environment in more detail, underwater production unit 12 includes a base 32, a porch 44 having a ramp 46, and inboard hub 40 in fluid communication with flow lines 61, 62 from either a Christmas tree or a manifold center. The inboard hub 40 has a sealing face 48, a cylindrical bearing 54 and an intermediate collar 56. Bearing 54 is slideably received within a bearing housing 58 which is longitudinally slideably supported on production unit 12. Inboard hub 40 is connected to loops on flow lines 61, 62. Porch 44 supports the flow line bundle 16 while it is aligned. Ramp 46 extends outwardly and downwardly to the ocean bottom 14 and guides flow line bundle 16 onto porch 44. Other hubs and ramps may be mounted on production unit 12 for connection to hydraulic control lines and/or electrical conduits.

Pull-in tool 10 includes a run-in tool 80 shown in FIG. 2, alignment means 26, latch 24, and hydraulic cable puller 20. Pull-in tool 10 is lowered to the ocean bottom 14 using drill pipe 64 and is guided onto guide posts 66 of base 32 by guidelines 68 extending to the surface. Run-in tool 80 includes guide tubes 70 which telescope over guide posts 66. Hydraulic lock down apparatus 72, provided on run-in tool 80, hydraulically actuates a pin 74 which pins guide tubes 70 to guide posts 66.

Latch 24 on pull-in tool 10 has a generally cylindrical housing with a front opening 82 for receiving bull nose 22 on flow line bundle 16. A plurality of latch jaws 84 are pivotally mounted in the housing and swing into engagement behind annular shoulder 86 on bull nose 22 for securing bull nose 22 within latch 24. Latch 24 includes a spring actuated orientation pin 85 which engages an alignment slot (not shown) in plate 88 of pull-in adapter 30.

Orientation device 26 orients latch 24 with bull nose 22 by longitudinal and rotational movement. Upon proper alignment of bull nose 22 and bull nose latch 24, hub 50 on flow line bundle 16 is properly aligned with inboard hub 40 for sealing and connection.

Cable 18 extends from vessel A passing through drill pipe 64, orientation device 26, and bull nose latch 24 for connection to bull nose 22. As hydraulic cable puller 20 pulls on cable 18, flow line bundle 16 moves toward production unit 12. Eventually flow line bundle 16 rides up ramp 46 and onto porch 44 where latch 24 swivels downwardly to receive bull nose 22. Latch 24 then engages bull nose 22 and alignment device 26 properly aligns flow line bundle 16 with respect to production unit 12. Flow line bundle 16 is then secured to production unit 12 by lock down apparatus 92 activated by pull-in tool 10.

Flow lines 28, 29 terminate in lock down apparatus 92 which is permanently fastened to the ends of flow lines 28, 29 and to hub 50. Flow line hub 50 is carried within a protective cage 90 comprising a box-like structure which may be covered on the bottom by a hinge cover, and plate 88 is provided with an alignment slot in its upper edge for alignment with orientation pin 85 on latch 24. Pull-in adapter 30 with plate 88 and bull nose 22, cage 90, and part of lock down apparatus 92 are removably connected to hub 50 and flow lines 28, 29 for retrieval from the surface.

Protective covers 42, 52 for inboard hub 40 and outboard hub 50 are substantially the same and a description of cover 52 will be descriptive of cover 42.

Figure 4:
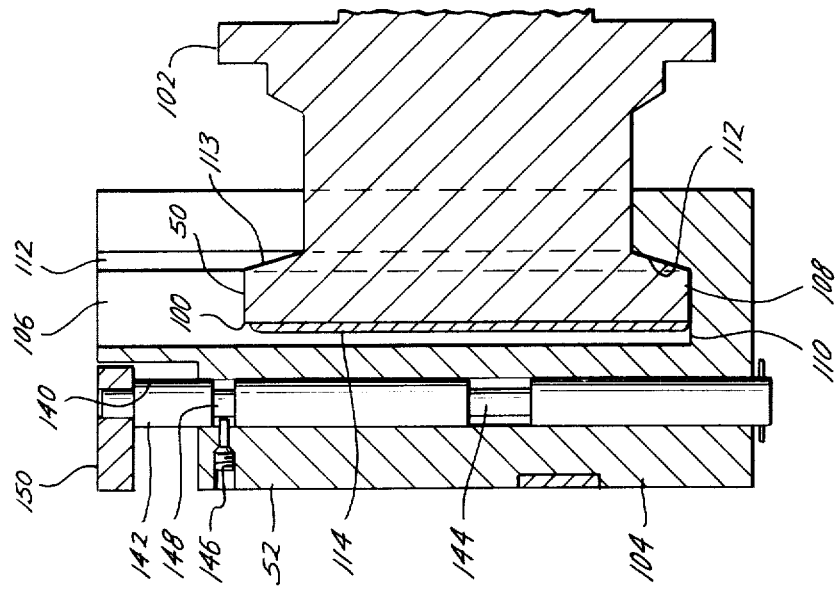
FIG. 4 is a vertical section view of the protective cover taken at line 4—4 of FIG. 3.
Figure 3:
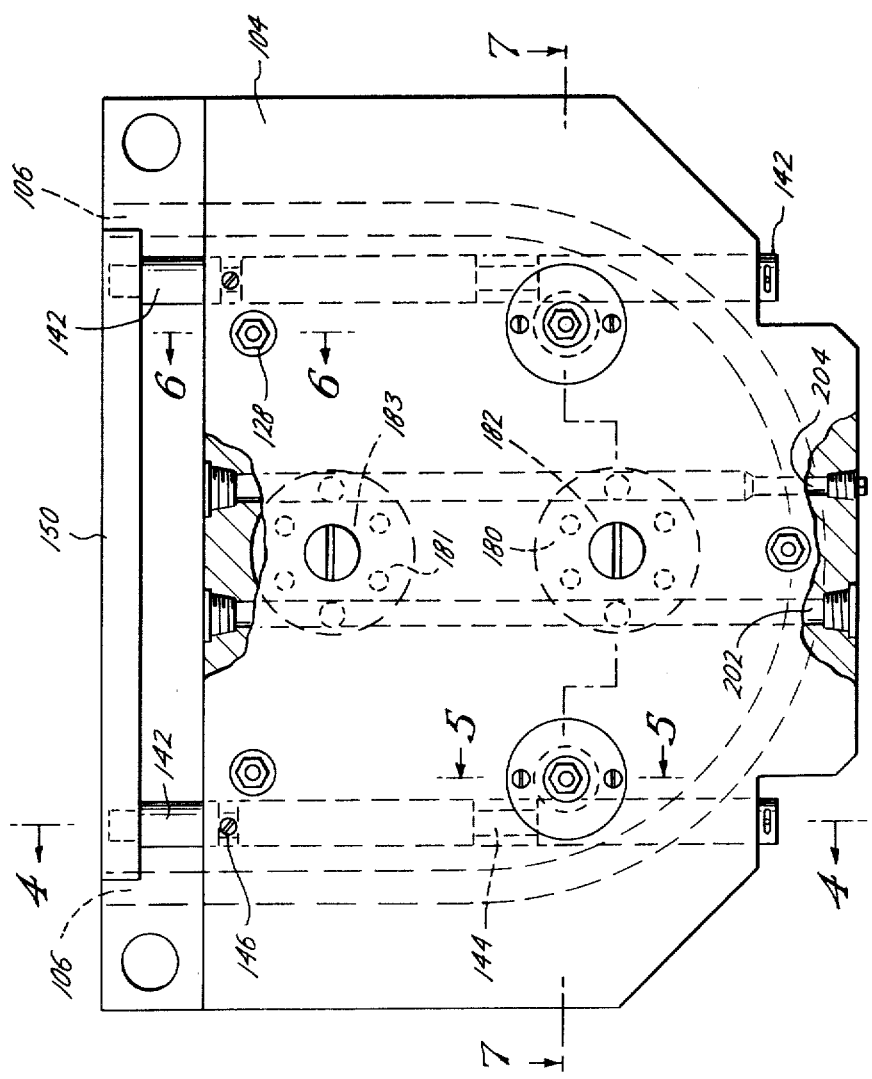
FIG. 3 is an elevation view of the protective cover used on the hubs according to the invention.
Figure 7:
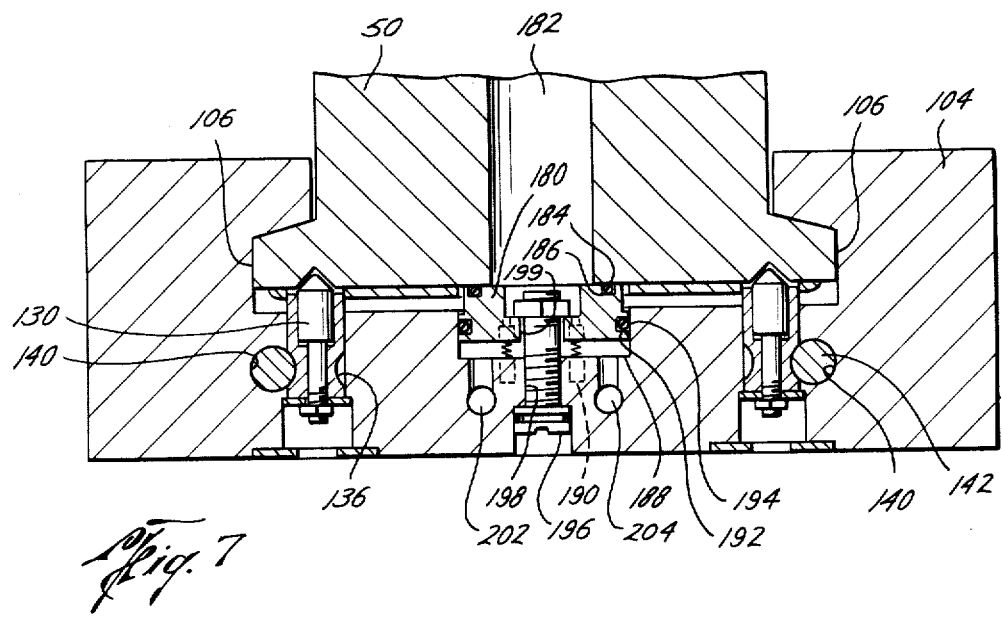
FIG. 7 is a section view of the cover mounted on the hub taken at line 7—7 of FIG. 3.

Referring now to FIGS. 3, 4 and 7 illustrating cover 52 and hub 50, hub 50 includes a sealing face 100 and a collar 102 between sealing face 100 and the lock down apparatus 92 shown in FIG. 1. Protective cover 52 is releasably attached to hub 50 and comprises a body 104 having a U-shaped cavity 106 configured to receive head 108 of hub 50. Cavity 106 includes a U-shaped groove 110 creating annular shoulder 112 for mating with annular shoulder 113 on hub 50 created by head 108. Cover 52 is assembled onto hub 50 by inserting head 108 through the open end of cavity 106. The mating shoulders 112, 113 prevent head 108 from being pulled out of cavity 106 except by sliding it back through the open end of cavity 106. Cone ended detent plungers 130, hereinafter described with reference to FIG. 5, prevent the hub 50 from sliding out of cavity 106 through its open end after hub 50 has been inserted into cavity 106.

A protective plate 114 is housed within cavity 106 to engage the sealing face 100 of hub 50 to prevent damage to it. Plate 114 is made of a relatively soft, preferably plastic material, such as "Delrin" manufactured by E. I. duPont de Nemours of Wilmington, Del. Plate 114 is fastened to body 104 of hub cover 52 by means of fastening assemblies 116 shown in FIG. 6.

Figures 5, 6:
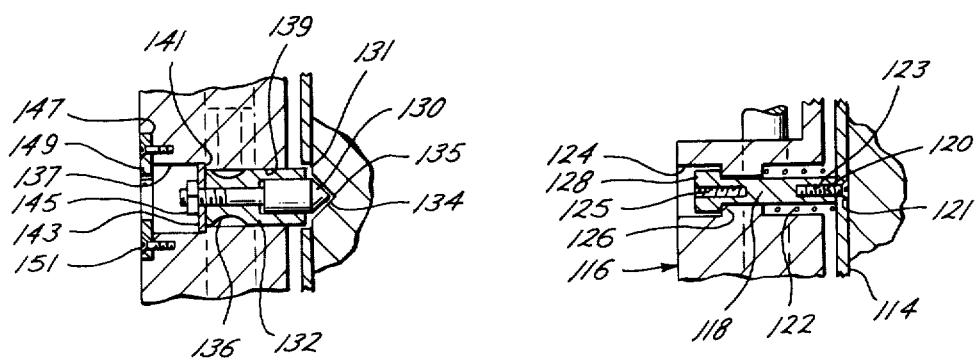
FIG. 5 is a fragmentary section view taken at line 5—5 of FIG. 3.
FIG. 6 is a fragmentary section view taken at line 6—6 of FIG. 3.

Referring now to FIG. 6, fastening assemblies 116 include a rod 118, screw 120, and spring 122. Rod 118 is inserted into aperture 124 having a reduced diameter portion 126. Rod 118 has a head 128 engageable with one side of reduced diameter portion 126. Plate 114 is secured to other end of rod 118 by screw 120 passing through aperture 121 in plate 114 and threadingly engaging tapped hole 123 in rod 118. Spring 122 is housed in aperture 124 and is biased between plate 114 and the other side of reduced diameter portion 126. Thus, protective plate 114 is biased into engagement with the face 100 of hub 50 by means of spring 122. A tapped bore 125 is provided in the head 128 of rod 118 for connecting a threaded device (not shown) to rod 118 to retract plate 114 during assembly of hub 50 within cavity 106.

Protective cover 52 is held in place on hub 50 by means of a pair of detent plungers 130 shown in FIG. 5. Detent plungers 130 are made of soft metal and aligned so that they will not drag on or scratch the sealing surface 100 of hub 50. Each of the detent plungers 130 is secured within a tube 132 which is secured in position as described hereinafter. Tube 132 is positioned so that detent plunger 130 passes through apertures 131 in protective plate 114 and engages a detent recess 135 in the face 100 of hub 50. Tube 132 is housed in aperture 137 having a reduced diameter portion 139 for slidingly receiving tube 132. The reduced diameter portion 139 creates an annular shoulder 141 for engaging the washer 143 around the nut 145 threaded onto the end of detent plunger 130. The aperture 137 in body 104 has a counterbore portion 147 for receiving a second washer 149 attached to cover body 104 by screws 151. Second washer 149 has a hole to permit access to nut 145 for adjustment of detent plunger 130.

Referring now to FIGS. 3-5, tube 132 has an annular groove 136 around its outer periphery for matching alignment with a longitudinal bore 140 passing through the length of cover body 104. A rod 142 is received within bore 140 and includes a reduced diameter portion 144 located in position just above tube 132 as shown in FIGS. 3 and 4. Groove 136 receives a portion of the body of rod 142 in the position shown in FIG. 3 so that rod 142 holds tube 132 and therefore detent plunger 130 in position within hub detent recess 135. Rod 142 is held in its uppermost position as shown in FIGS. 3 and 4 by shear pin 146 which engages a second reduced diameter portion 148 in rod 142.

Rods 142 are attached to a trigger plate 150 housed in a recess in the upper portion of cover body 104 and flush with the top of cover 52 whereby upon the application of a downward force on trigger plate 150 by buttons 170 of connector tool 60 shown in FIG. 8, shear pins 146 are sheared to permit rod 142 to move downwardly so that reduced diameter portion 144 is located opposite groove 136 in detent tube 132. Upon the application of downward force on cover 52 resulting from its contact with trigger plate 150, the cone of detent plunger 130 engages the mating tapered surface 134 in detent recess 135 and causes detent plunger 130 and tube 132 to be biased laterally out of hub face recess 135 and retracted within aperture 137 permitting hub cover 52 to be disconnected from hub 50.

Referring now to FIGS. 3 and 7, an annular seal plate 180 is housed in counterbore 188 in body 104 and sealingly engages and circumscribes flow ports 182, 183 corresponding with flow lines 29, 28. An annular seal ring 184, housed in annular groove 186 in seal plate 180, sealingly engages the face 100 of hub 50 around flow port 182. Seal plate 180 is permitted reciprocal movement within counterbore 188. Springs 190 housed in mating counterbores in seal plate 180 and body 104 bias seal plate 180 into sealing engagement with face 100 of hub 50. Around the annular periphery of seal plate 180 is a groove 192 housing an annular seal member 194 for sealing engagement around the inner surface forming counterbore 188. A bolt 196, passing through bore 198 in body 104 and through bore 199 in seal plate 180, fastens seal plate 180 to body 104. Bore 199 is sufficiently larger than the cross-sectional area of bolt 196 to permit the passage of fluids. There are also holes through the central portion of seal plate 180 permitting further passage of fluids between ports 182, 183 and counterbores 188.

Springs 190 initially bias seal plate 180 into sealing engagement with face 100 of hub 50. However, upon application of fluid pressure in flow line 29 and corresponding flow bore 182, fluid pressure is transmitted through bore 199 around bolt 196 and the holes in seal plate 180 and into counterbore 188 thereby applying pressure against the backside of seal plate 180. Since the cross-sectional area of the backside of seal plate 180 is greater than the cross-sectional area on the frontside of seal plate 180, the fluid pressure through flow line 29 causes plate 180 to sealingly engage face 100 of hub 50.

A seal plate 180, 181 is provided for each flow bore 182, 183 as illustrated in FIG. 3 permitting a fluid pressure seal to be used in seal testing and flow line cleaning. Flow ports 202 and 204 extending longitudinally through cover body 104 provide fluid communication between flow lines 28, 29 to permit fluid pressure to be applied through one flow line and return through the other flow line to permit seals to be tested. Further, a lead nosed pig may be run through one of the flow lines for engagement with the end of bolt 196 and returned by reversing the fluid pressure in the flow lines 28, 29 and flow ports 202, 204 to remove any debris in the lines and check that no obstructions exist.

Referring to FIGS. 1 and 8, after hub 50 with cover 52 is in position and locked onto production unit 12 and tool 10 is removed, flow line connector running tool 60 is lowered into place by means of a drill pipe running string 160. Tool 60 is guided into proper position by means of guide tubes 162 which follow guide posts 66 and guide lines 68 on base 32. Flow line connector running tool 60 has a frame 164 on which is moveably mounted two fork members 166, 168. Forks 166, 168 are hydraulically mounted on frame 164 for lateral movement and each has a slot for receiving bearing housings 54, 51 of hubs 40, 50 respectively.

Flow line connector tool 60 also includes clamping means 38 and seal plate 36. Seal plate 36 is supported between the two halves of clamping means 38 whereby as tool 60 is lowered into position, the lower half of clamping means 38 passes between hubs 40, 50. Upon further downward movement of tool 60, buttons 170 engage trigger plate 150 on covers 42, 52 thereby releasing protective covers 42, 52 and causing them to drop off inboard and outboard hubs 40, 50 onto the ocean floor. Seal plate 36 is then aligned between hubs 40 and 50.

After seal plate 36 is aligned between hubs 40, 50, forks 166, 168 are hydraulically energized to engage collars 56, 102 and move inboard hub 40 toward outboard hub 50 sandwiching seal plate 36 therebetween. Since outboard hub 50 is latched down on porch 44, only inboard hub 40 moves by sliding movement within bearing housing 58, such movement being absorbed in the loops of flow lines 61, 62 on production unit 12.

The two halves of clamp assembly 38 are then moved together by the rotation of a hexagon socket which is driven by motors and a gear box clamping the facing hubs 40, 50 into sealing engagement with the seal member 36.

Hydraulic pressure is then applied to release the latch members and the connector running tool 60 is then hoisted upwardly by means of drill pipe 160 to be retrieved by vessel A.

Although only hub 50 and protective cover 52 on flow line bundle 16 have been described in detail, it can easily be appreciated that protective cover 42 or hub 40 may be of the same design for accomplishing the same purposes.

Although this invention has been described primarily in terms of the connection of a flow line hub to a hub on an underwater production unit, the same apparatus and method may be used for connection of electrical cables and hydraulic control lines, as previously indicated. Such modifications as may be necessary to achieve such connections will be apparent to those skilled in the art.

Various other embodiments and modifications will also be apparent from the foregoing description. The invention is therefore not limited to the specific embodiments disclosed, but extends to every embodiment within the scope of the appended claims.

We claim:

1. A temporary cover for a hub, the hub having an outwardly extending end flange with a front sealing face, comprising:
    a body member having one end adapted to enclose the hub, said body member having a blind cavity of substantially U-shape in said one end with the opening of the U extending through the top of the body member, said cavity having an outer portion shaped correlatively to the hub portion adjacent the flange end and an enlarged groove at its inner end shaped correlatively to such flange,
    means disposed substantially inside said body member for releasably lockingly engaging such sealing face of said hub, said engaging means including a first reciprocable member movable between a first position in engagement with, and a second position released from, such sealing face of said hub, and a second reciprocable member movable between a latched position in engagement with said first member and retaining said first member in said first position, and an unlatched position released from said first member, and
    a trigger mechanism operable to move said second member from its latched to its unlatched position to release said second member from said first member, said first member including camming means thereon cooperable with a correlatively shaped portion of such sealing face for moving said first member to its second position out of engagement with said hub when said second member is in said unlatched position upon applying a downward force to said cover, whereby said cover is released from said hub.

2. A temporary cover as defined by claim 1 wherein said first reciprocable member includes at least one detent plunger slidably disposed in an axial bore in said body member communicating with the inner end of said cavity, one end of said plunger protruding from said axial bore into said cavity and having said camming means thereon, and said second reciprocable member includes a rod slidably disposed in a longitudinal bore communicating with said axial bore and extending through the top of said body member, said rod including surface means for alternately engaging with and disengaging from said detent plunger when said rod is moved between said latched and unlatched positions, respectively, one end of said rod protruding from the top of said longitudinal bore, and
    said trigger mechanism includes trigger plate means engageable with said one end of said rod for moving said rod to its unlatched position upon applying a downward force to said trigger plate means.

3. A temporary cover as defined in claim 2 wherein said detent plunger includes a tube having an annular groove therearound, and said surface means of said rod includes an interfering portion of said rod having a diameter such that it engages the walls of said annular groove when said rod is in said latched position and a reduced diameter portion of said rod adjacent said interfering portion and located such that when said rod is in said unlatched position, said reduced diameter portion is adjacent said annular groove of said tube of said detent plunger, the outer surface of said reduced diameter portion being sufficiently spaced from the outer surface of said annular groove to permit sufficient movement of said tube with respect to said rod to release said detent plunger from engagement with the hub.

4. A temporary cover as defined in claim 3 further including shear means connected between said rod and said body member initially to hold said rod in said latched position and subsequently to release said rod for movement within said longitudinal bore in said body member upon application of sufficient force on said shear means.

5. A temporary cover for a hub, the hub having an outwardly extending end flange thereon, comprising
    a body member having a height and width greater than the diameter of the flange,
    a U-shaped blind cavity in one side of the body member, with the opening of the U extending through the upper edge of the body member,
    said blind cavity having an outer portion configured to matingly receive the portion of said hub adjacent said flange and an inner, enlarged groove portion configured to matingly receive said flange, the enlarged groove portion having a depth toward the inner end of said blind cavity that is greater than the thickness of the flange, the hub and flange being slidably insertable into said cavity from the top of said body member through the opening of the U,
    at least one detent plunger slidably disposed in an aperture in the inner end of said blind cavity and positioned alternately to extend from said aperture to engage said flange to retain said flange within said cover groove or to retract into said aperture to disengage from said flange, and
    a trigger mechanism cooperable with said detent plunger and operable to move said detent plunger from its extended to its retracted position to release said detent plunger from said flange, permitting said hub cover to move downwardly out of engagement with said flange.

6. A cover for a hub, the hub having an outwardly extending end flange with an end sealing face and a longitudinal axis, comprising:
    a body member adapted to removably enclose the hub, said body member including means for receiving the hub therewithin upon relative motion between the hub and said body member in a direction transverse to the longitudinal axis of the hub, and means engageable with the hub flange for preventing removal of said body member from the hub in a direction coaxial with the longitudinal axis of the hub;
    means housed within said body member for lockingly engaging the face of the hub and preventing relative motion between the hub and said body member in such transverse direction; and means housed substantially within said body member movable from a first position for biasing said engagement means against the face of the hub to a second position where said engagement means is not biased against the hub, and including means for releasably supporting said biasing means within said body member in said first position, said supporting means being releasable from said biasing means and said biasing means thereupon being movable from said first position to said second position upon application of force to said biasing means in such transverse direction.

7. A cover as defined by claim 6 further including means for retracting said engagement means from the hub face, said retracting means including a conical shaped camming surface disposed on said engagement means cooperable with a correlatively conical shaped camming surface on said hub face, said camming surfaces being relatively slidable with respect to each other to wedge said engagement means axially out of engagement with said hub when said biasing means is in said second position upon application of additional force to said body member in such transverse direction.

8. A cover for a flow line hub, the hub having a flange around its sealing face and ports communicating with at least two flow lines, comprising:
   a body member having a cavity in one end adapted to enclose the hub, there being a space between the inner end of the cavity and the sealing face of the hub;
   first seal means on said body member for sealingly engaging the sealing face of said hub and circumscribing a first flow line port;
   second seal means on said body member for sealingly engaging the sealing face of said hub and circumscribing a second flow line port;
   actuating means disposed in said space between said body member and said sealing face of said hub and responsive to line pressure in said flow lines for biasing said first and second seal means into sealing engagement with the sealing face of the flow line hub; and
   port means on said body member providing fluid communication within said body member between the first and second flow line ports.

9. A cover as defined by claim 8 wherein said first and second seal means each include a substantially cylindrical seal plate reciprocably mounted within a counterbore in said body member communicating with the inner end of said cavity and coaxial with said ports in said hub and further include annular seal members mounted in grooves around the sides of said seal plates engaging the walls of said counterbores in said body member and in grooves in one end of said seal plates engaging the sealing face of the flow line hub.

10. A cover as defined by claim 9 wherein said first and second seal means includes adjustment means for adjusting the travel of said first and second seal plates within said counterbores in said body member.

11. A cover as defined by claim 9 wherein said actuating means further includes an axial bore through said seal plates communicating with said flow ports, the length of said seal plates being less than the length of said counterbores, the area on said one end of said seal plates exposed to flow line pressure being less than the area on the other end of said seal plates also exposed to flow line pressure through said axial bore, said areas on said other ends of said seal plates forming a pressure responsive area on said first and second seal plates actuated by the flow line pressure within the first and second flow ports.

12. A cover as defined by claim 11 wherein said actuating means further includes biasing means to cause such sealing engagement where there is no flow line pressure.

13. A temporary cover for a hub, the hub having an outwardly extending end flange and a front sealing face thereon, comprising:
   a body member of greater width and height than the diameter of the flange;
   a U-shaped cavity in one end of said body member configured to provide an annular shoulder that slidingly engages said flange;
   at least one detent plunger reciprocably mounted in an aperture communicating with said cavity, said detent plunger having one end engageable with a detent recess in the sealing face of said hub and having a circumferential groove therearound;
   a trigger mechanism including a surface at the top of the temporary cover connected to at least one rod movably mounted within a longitudinal bore in said body member communicating with said aperture, said rod being movable from a raised to a lowered position, said rod having a latching surface portion which engages the sides of said groove in said detent plunger when said rod is in said raised position and a decreased diameter portion positioned adjacent to said groove of said detent plunger when said rod is in said lowered position, the surface of said decreased diameter portion being sufficiently spaced from the surface of said groove so as to allow said detent plunger to move in said aperture a distance sufficient to disengage said one end of said detent plunger from said detent recess;
   at least two annular seal plates housed within counterbores of said body member for sealingly engaging a plurality of flow line ports in the hub;
   means for biasing said seal plates against the hub; and
   port means providing fluid communication within said body member between the flow line ports of the hub.

* * * * *